Aug. 29, 1950 | C. W. STOOPS | 2,520,177

VARIABLE REJECTION FILTER

Filed Jan. 18, 1946

INVENTOR.
CHESTER W. STOOPS

BY M. A. Hayes

ATTORNEY

Patented Aug. 29, 1950

2,520,177

UNITED STATES PATENT OFFICE 2,520,177

VARIABLE REJECTION FILTER

Chester W. Stoops, Washington, D. C.

Application January 18, 1946, Serial No. 642,057

5 Claims. (Cl. 178—44)

(Granted under the act of March 3, 1883, as amended April 30, 1928; 370 O. G. 757)

This invention relates to rejection filters and is particularly directed to a filter in which the rejection characteristics can be readily varied.

Such filters have a wide variety of applications in electronic devices. They are particularly desirable as anti-hunt or equalizing circuits in servo automatic control systems. This employment of the circuit has been illustrated in my copending application Serial No. 616,943 filed September 17, 1945, Patent No. 2,443,644, issued June 22, 1948, entitled "Thyratron Control Servo Amplifier." The invention can, however, be applied to other types of servo systems.

It is an object of the invention to provide a rejection filter in which the voltage amplitude ratio of a given frequency passed to other frequencies passed by the filter can be varied.

It is another object of the invention to provide an improved filter network for use as an anti-hunt unit in servo systems.

It is still another object of the invention to provide a varying amount of anti-hunt control with fewer precision parts.

The invention will be further understood with reference to the exemplary embodiment in the drawing in which.

Figure 1:
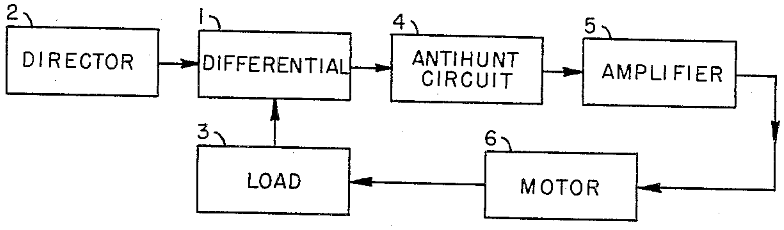
Fig. 1 shows in block diagram an application of the invention as an anti-hunt device.

The servo system of Fig. 1 operates by deriving a control voltage depending on the difference in position of an input shaft and an output shaft. This voltage is used to control a driving motor, which moves the output shaft to correspondence with the input shaft.

The differential 1 generates an error voltage related to the difference in position between the output shaft of director 2 and the shaft which positions the load 3. The error voltage is ordinarily an amplitude modulated wave, usually 60 C. P. S., which consists essentially of the carrier frequency and upper and lower side bands.

This error signal from the differential 1 passes through the anti-hunt network 4, whose function is to cause the load to follow more closely the motion of the director.

Since the anti-hunt properties of the device depend on the ratio of side band frequencies to carrier frequency passed on to amplifier 5, the rejection characteristics of the filter are made variable in order that the system may be adaptable to various loads.

The amplifier 5, which receives the error signal from the anti-hunt circuit 4 may be one of various types known to the art. Its output drives the motor 6 at a speed and in a direction dependent on the amplitude and phase of the error signal. It is so designed as to drive the motor in such a direction as to lessen the error existing between the load and director.

Figure 2:
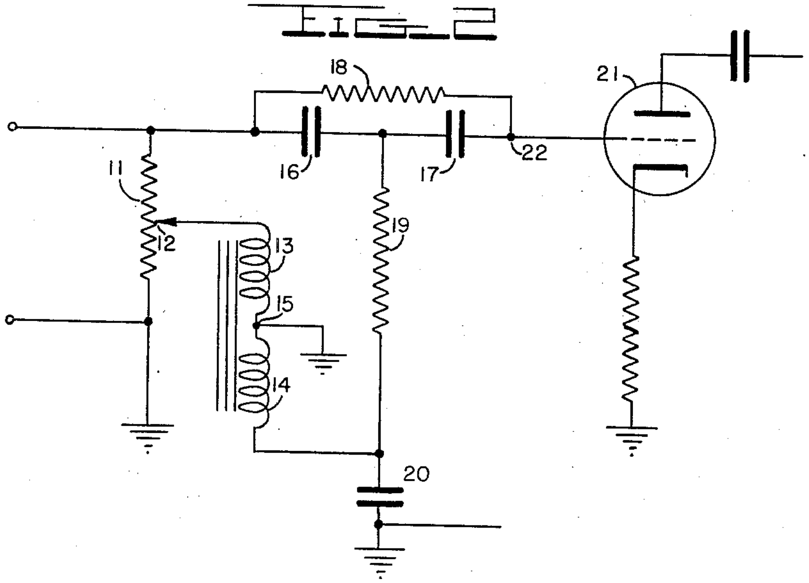
Fig. 2 shows in circuit diagram an exemplary embodiment of the invention.

As already noted, without the filter or anti-hunt circuit 4, the load would not follow the motion of the director with any degree of accuracy due to oscillation and lag. The filter is essentially a differentiating circuit used to overcome the integrating action inherent in the output. If $e$ is the amplitude of the envelope of the input error voltage to a "bridged T" filter as shown in Fig. 2, the output, $$e_1 = ae + \frac{bde}{dt}$$

where $a$ and $b$ are constants of proportionality.

The amplitude modulation of the carrier depends on the rate at which the error is changing. The amplitude of a given side band frequency (i. e., a derivative) that will be transmitted by the filter varies as a function of the difference in frequency between the carrier and the side bands. Since the difference between the carrier and side frequencies depends on the rate at which the carrier amplitude is changing, the filter output gives an indication of the rate at which the error is changing, and the motor will be given added acceleration when the error is changing rapidly.

Servo systems working under varying loads will need varying degrees of anti-hunt control. This means varying ratios of derivative to carrier or a different ratio $a/b$, $a$ and $b$ being the constants in the above equation. This invention offers a simple means of varying $a/b$ by introducing part of the input to the filter in inverse phase to the output of the filter to cancel out part of the carrier.

The embodiment of the invention shown in Fig. 2, is an exemplary circuit diagram of the rejection filter. It can be used as the anti-hunt circuit 4 of Fig. 1.

11 is a low resistance potentiometer, with sliding contact 12, and 13 and 14 comprise an auto transformer grounded at point 15 to give a small turns ratio of 14 to 13 and to provide for phase reversal. Condensers 16 and 17 and resistors 18 and 19 comprise a conventional "bridged T" null filter. Condenser 20 is used to balance out the inductive reactance of coil 14. Tube 21 is the first stage of power amplification.

The output of the "bridged T" alone at point 22 is a voltage with the carrier attenuated greatly in relation to the side bands. A certain part of the input to the filter as determined by the position of contact 12 is fed with 180 degrees phase reversal to the "bridged T" through resistor 19. Since the carrier is not appreciably attenuated through this path, the out of phase voltage arrives at point 22 relatively stronger in carrier than does the in phase voltage. This has the effect of cancelling out a relatively large proportion of carrier than side bands, when the two waves unite at point 22. By varying the position of the potentiometer contact 12, the amount of carrier cancelled out can be controlled and hence we can obtain any desired ratio $a/b$.

By choosing potentiometer 11 small and making the ratio of turns of transformer sections 13 to 14 large, only a small impedance will be reflected back in series with resistor 19. Hence varying the position of the potentiometer arm will not appreciably affect the balance conditions of the "bridged T."

The only precision parts required are the condensers 16 and 17 and resistors 18 and 19, which permits considerable economy over prior systems.

It is to be understood that the particular embodiment of the invention herein described is exemplary only and that the scope of the invention is to be limited only as set forth in the appended claims.

The invention described herein may be manufactured and used by or for the Government of the United States of America for governmental purposes without the payment of any royalties thereon or therefor.

What is claimed is:

1. A transmission circuit comprising a null network of the "bridged T" type, means introducing an amplitude modulated voltage wave to the null network, the null network being operative to attenuate the carrier wave to a greater degree than the side bands, means introducing a variable portion of the input voltage in reverse phase to the null network to further attenuate the carrier in relation to the side bands.

2. A transmission circuit comprising a "bridged T" filter network having input and output terminals connected thereto and a single shunt impedance leg, means applying an electrical input signal to the input of said network, a signal inverting device connected to said shunt impedance leg, means applying a selectable portion of said input signal to said signal inverting device operative to introduce said selectable portion in inverse phase into the shunt leg of said network.

3. A transmission circuit comprising a "bridged T" filter network having input and output terminals connected thereto and a single shunt impedance leg, means applying an electrical input signal to the input of said network, a phase inverting transformer connected to and forming a part of said shunt impedance leg, means applying a selectable portion of said input signal to said transformer operative to introduce said selectable portion in inverse phase into the shunt leg of said network.

4. An anti-hunt circuit for use in Servo automatic control systems comprising in combination, a common connection terminal, an auto transformer having a tap connected to said common terminal, a rejection filter, said filter having an input and an output condenser connected in series, a first filter resistance connected in parallel with said series connected condensers, and a second filter resistance connecting the interconnection of said condensers to one end of said transformer, a potentiometer connected from the input condenser to the common terminal, said potentiometer having a variable tap connected to the other end of said transformer whereby a variable fraction of an input signal will be introduced in reverse phase to the filter output.

5. An anti-hunt circuit for use in servo automatic control systems comprising, in combination, a rejection filter of the "bridged T" type having input and output terminals connected thereto and a T terminal intermediate to said input and output terminals, a voltage dividing means connected across the input of said filter and having a variable tap point, means introducing an error signal to the input of the filter, signal inverting means serially connected between said variable tap point and said T terminal for introducing a variable fraction of the input signal in reverse phase to the output of the filter.

CHESTER W. STOOPS.

REFERENCES CITED

The following references are of record in the file of this patent:

UNITED STATES PATENTS

| Number | Name | Date |
|---|---|---|
| 2,230,803 | Klipsch et al. | Feb. 4, 1941 |
| 2,233,415 | Hull | Mar. 4, 1941 |
| 2,399,675 | Hays | May 7, 1946 |